Figure 1:
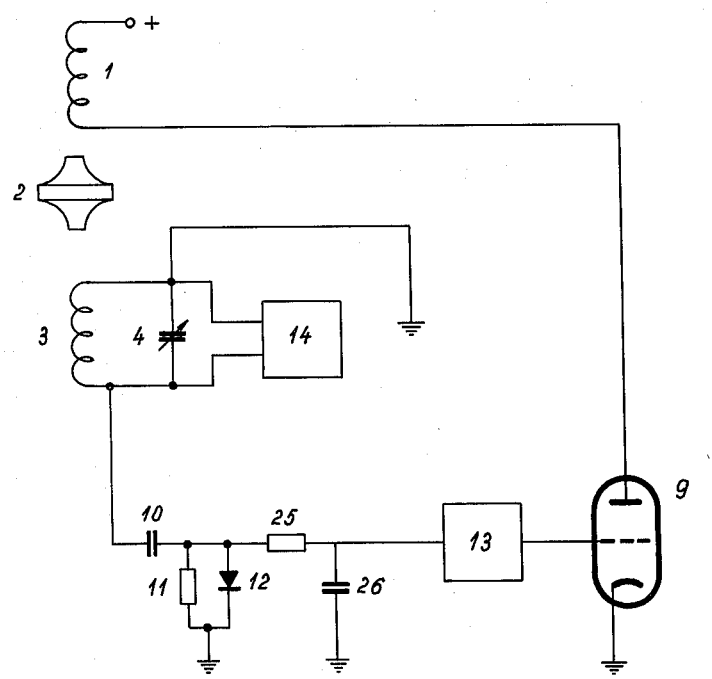

Nov. 2, 1965 B. CARNIOL 3,215,901
METHOD AND DEVICE FOR MAINTAINING STATIONARY
POSITION OF A FERROMAGNETIC BODY FREELY
FLOATING IN ELECTROMAGNETIC FIELD
Filed Nov. 22, 1961 5 Sheets-Sheet 1

INVENTOR.
Bohdan Carniol
BY

United States Patent Office 3,215,901
Patented Nov. 2, 1965

3,215,901
METHOD AND DEVICE FOR MAINTAINING STATIONARY POSITION OF A FERROMAGNETIC BODY FREELY FLOATING IN ELECTROMAGNETIC FIELD
Bohdan Carniol, Prague, Czechoslovakia, assignor to Tesla, narodni podnik, Prague, Czechoslovakia
Filed Nov. 22, 1961, Ser. No. 154,260
Claims priority, application Czechoslovakia, Nov. 28, 1960, 7,143/60
11 Claims. (Cl. 317—123)

This invention relates to a method and a device for maintaining a ferromagnetic body in a fixed position while freely floating in an electromagnetic field.

Known devices of this kind use a suspending electromagnet for generating a magnetic field in which the suspended body freely floats. The suspending electromagnet is controlled by a signal responsive to the relative position of the suspended ferromagnetic body and of a feeler or sensing device comprising a parallel LC-circuit whose electromagnetic properties change with changing distance of the ferromagnetic body from the feeler. Such devices are used for ultra-centrifuges whose rotor turns with a speed of several millions of revolutions per minute. Rotors running at such a high speed can be supported neither by mechanical bearings nor by cushions of air because at such speeds even the friction of air is too high. It is therefore known to arrange the rotors ultra-centrifuges in an evacuated space freely floating in the electromagnetic field generated by a suspending electromagnet. Rotational movement is imparted to the rotor by a second, rotating magnetic field.

Very accurate regulation equipment is necessary for maintaining rotor stability. The feeler which produces a regulation signal proportionate to the distance of the rotor from a reference point in the known devices has a parallel resonant circuit which is included in the feedback loop of an oscillator and is located under the rotor of the ultra-centrifuge in such a manner that there exists a magnetic coupling between the rotor and the induction member of the parallel resonant circuit of the feeler. With the aid of the parallel resonant circuit of the feeler, the oscillator is tuned to a high frequency. When the distance between the rotor of the ultra-centrifuge and the induction member of the parallel resonant feeler circuit changes, the coupling coefficient changes and the amplitude of the oscillations in the parallel resonant feeler circuit is altered. These changes of amplitude produce a regulation signal which is used to increase or to decrease the intensity of the magnetic field of the suspending electromagnet.

This known method of regulation has inherent disadvantages. A change of distance between the rotor and the feeler causes not only a change in the amplitude of oscillation in the parallel resonant circuit of the feeler but also affects the oscillation frequency, the feedback coupling coefficient of the oscillator etc., so that the automatic control may not work satisfactorily. The characteristic parameters of the feeler also are sensitive to variations in supply voltage to ageing, to replacement of the oscillator tube, etc.

The primary object of the invention is to keep the regulation signal of a feeler of the type described permanently proportional, to a very high degree of accuracy, to the distance of the suspended electromagnetic object from the feeler independent of fluctuations in the power supply voltage, of the ageing of electron tubes and of other unintentional and uncontrolled changes in the parameters of the feeler.

According to the invention, the parallel LC-circuit of the feeler is periodically excited by pulses whose frequency is smaller than the resonant frequency of the LC-circuit and a control or regulating signal is derived from the difference between the maximum amplitude of the oscillations in the LC-circuit of the feeler with the mean value of the rectified voltage of these oscillations.

Figure 2:
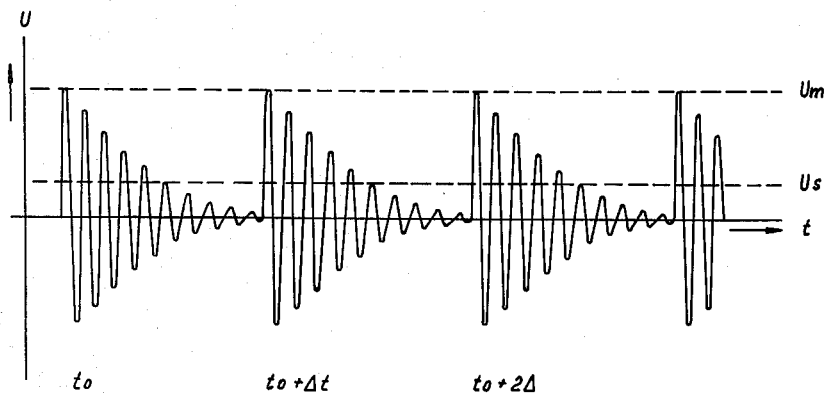
Figure 3:
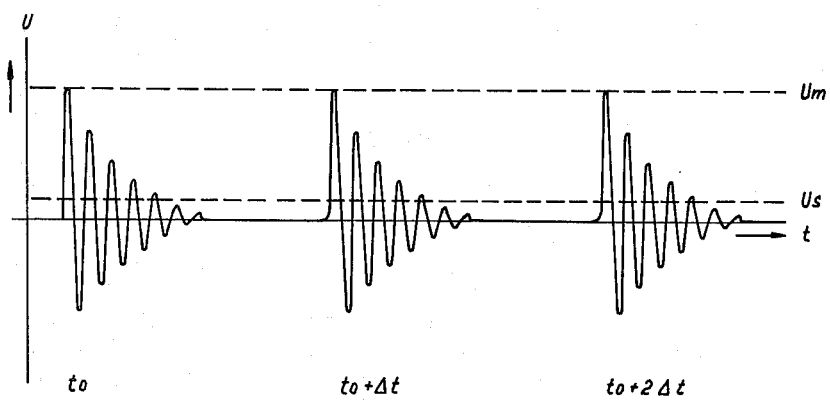
Figure 4:
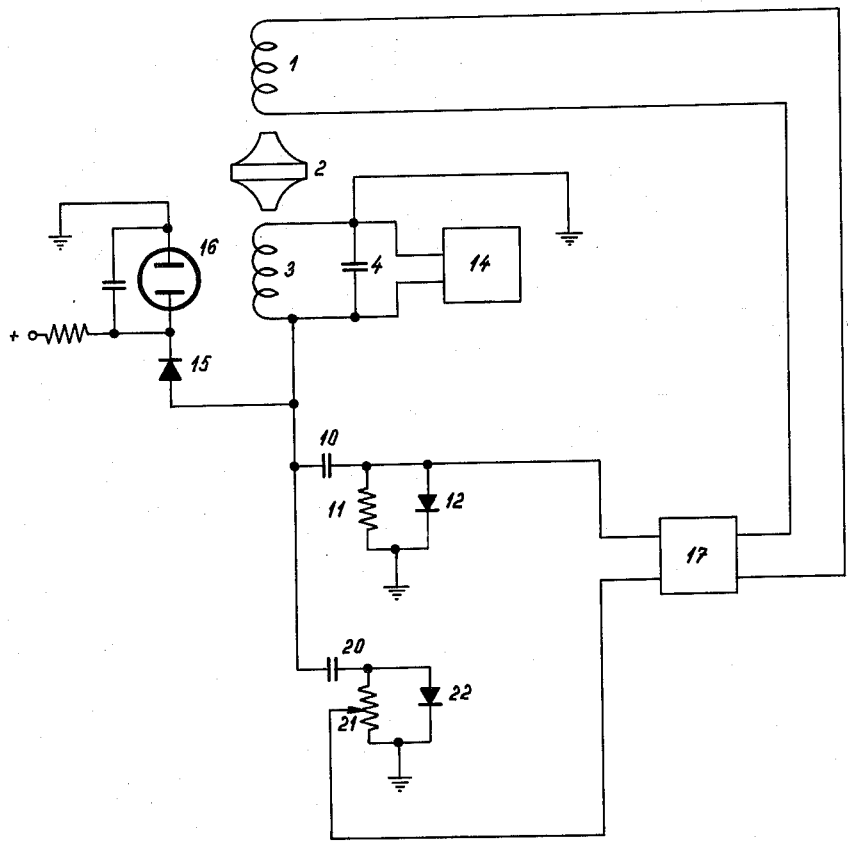
Figure 5:
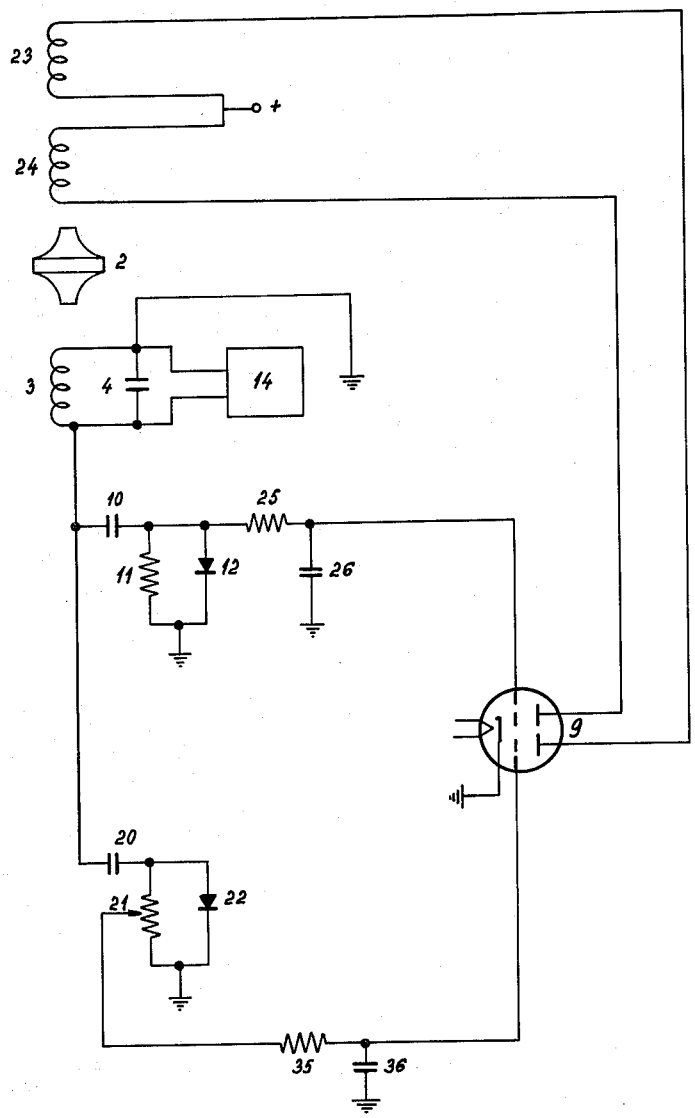
Figure 6:
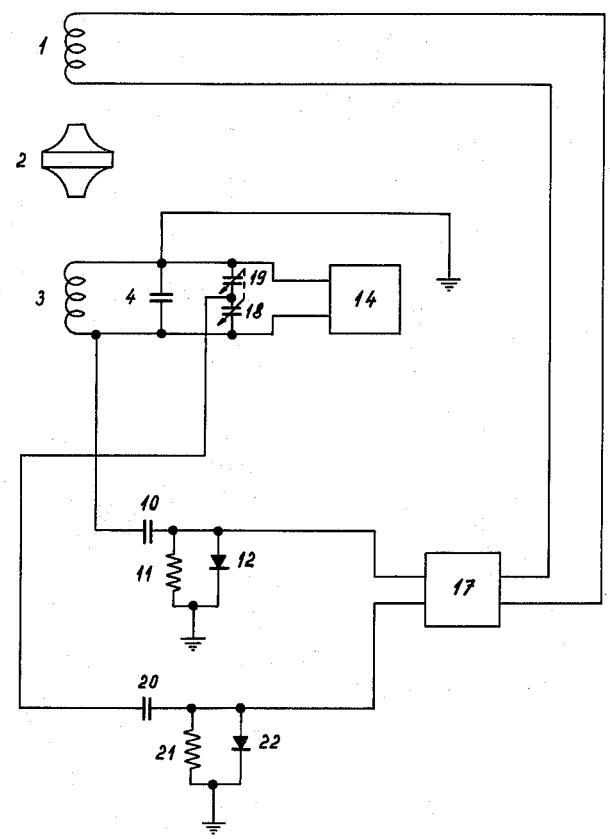

Further features and advantages of the invention will be apparent from the following description when considered with the accompanying drawings in which:

FIG. 1 is a circuit diagram of a first embodiment of a device for carrying out the method according to the invention, FIGS. 2 and 3 are time diagrams of voltage oscillations produced in the parallel LC-circuit of the feeler, FIG. 4 diagrammatically shows a second embodiment of a device of the invention, FIG. 5 shows a third embodiment, in which the suspending electromagnet has two separately fed windings, and FIG. 6 shows a fourth embodiment.

In the apparatus diagrammatically shown in FIG. 1, the ferromagnetic rotor 2 of an ultra-centrifuge, freely floats in the magnetic field of an electromagnet. The winding 1 of the magnet generates a magnetic field which balances the gravitational forces acting on the rotor 2 so that the latter is freely suspended in space. The position of the rotor is maintained by a feeler including a coil 3 and a capacitor 4. Pulses are generated in this parallel LC-circuit by a pulse generator 14 at frequency $f_s$ which is smaller than the resonant frequency $f_0$ of the LC-circuit 3, 4. Shapes of exponentially decreasing oscillations in the LC-circuit 3, 4 are shown in FIGS. 2 and 3. The exciting pulses of the pulse generator 14 are fed to the LC-circuit at times $t_0$, $t_0+\Delta t$, $t_0+2\Delta t$, etc. Each exciting pulse generates free oscillations having a maximum amplitude $U_m$. The mean value of the rectified voltage of the oscillations is $U_s$. The shape of the damped oscillations shown in FIG. 2 corresponds to the desired normal distance between the rotor 2 and the coil 3, whereas FIG. 3 shows the shape of the oscillations when the distance between the rotor 2 and the coil 3 is reduced. The maximum voltage amplitude $U_m$ is the same in both cases but the mean value $U_s$ of the voltage (calculated over the period between successive pulses) is smaller in the second case (FIG. 3) because the oscillations are damped more rapidly. If $U_m$ is practically constant, a measure of the rotor position may be derived directly from the value of $U_s$. It is thus possible to utilize the value of $U_s$ alone for obtaining the necessary regulating signal. This is achieved in the embodiment shown in FIG. 1 by rectifying the oscillations generated in the parallel LC-circuit 3, 4 by a rectifier 12, whose capacity 10 and resistance 11 are so chosen that their product RC, which is the time constant $T_1$ of the rectifier, is smaller than the smallest practically occurring value $T_m$ of the time constant $T_0$ of the LC-circuit 3, 4 of the feeler. The output voltage of the rectifier 12 is filtered through a resistor 25 and a capacitor 26. The filtered rectified voltage is supplied to the amplifier 9 which in the embodiment shown is represented by a triode. The output of the amplifier 9 feeds the winding 1 of the suspending electromagnet. The current passing through the winding 1 therefore changes responsive to the regulating signal and the rotor 2 may be steadily held in the desired normal position by the regulation of the magnetic field. A correcting member 13 of a known type is provided in the grid line of triode 9 to suppress oscillations in the control circuit. However, this correcting member is not indispensable for carrying out the method according to the invention.

As will be appreciated from the description of FIG. 1 the stability of the regulating signal depends substantially only on the stability of the time constant $T_0$ of the LC-circuit of the feeler, on the stability of the maximum amplitude $U_m$ of the oscillations in this circuit, and on a constant frequency of pulses produced by the pulse generator 14. Other parameters of the feeler have practically no influence on the regulating signal. The values $T_0$, $U_m$ and $f_s$ may be held constant very accurately and reliably by simple, known means, and absolutely accurate operation of the feeler or sensing device is thus possible.

In FIGS. 4 to 6, similar or corresponding elements have been denoted wtih same reference numerals as in FIG. 1, so that it will be sufficient to describe only those features in which the devices shown in FIGS. 4 to 6 differ from the embodiment shown in FIG. 1.

The embodiment shown in FIG. 4 differs from the embodiment shown in FIG. 1 by a stabilizer circuit mainly consisting of a diode 15 and a gas-discharge tube 16. The stabilized voltage $U_z$ of the gas-discharge tube 16 is chosen smaller than the maximum voltage amplitude $U_m$ of the oscillations in the feeler LC-circuit so that the diode 15 is normally blocked but passes the peak of the first free oscillation. The embodiment shown in FIG. 4 further comprises a second rectifier 22 whose capacity 20 and resistance 21 are so chosen that the time constant $T_2$ of the rectifier 22 is greater than the time constant $T_0$ of the LC-circuit 3, 4 so that the rectifier 22 produces a voltage corresponding to the maximum voltage amplitude $U_m$ of the oscillations in the LC-circuit. The output voltages of the rectifiers 12 and 22 are supplied to the differential amplifier 17. The output of the amplifier 17 corresponds to the difference $U_s - U_m$ and is fed to the winding 1 of the suspending electromagnet to control the intensity of its magnetic field in a similar manner as in the embodiment of the invention shown in FIG. 1.

The resistor 21 is adjustable to permit tapping a voltage $a.U_m$ instead of $U_m$ wherein $a$ is a coefficient smaller than one. The output of the amplifier 17 thus corresponds to the difference $U_s - a.U_m$. By choosing a suitable value of the coefficient $a$ it is possible to adjust the difference $U_s - a.U_m$ so that it will fluctuate about zero, and thereby to increase the sensitivity of the device since the dependance of the regulating signal on the maximum amplitude $U_m$ is substantially reduced.

As shown in FIG. 5, it is possible to filter the output signals of the rectifiers 12 and 22 through the resistor 25 and capacitor 26, and the resistor 35, and capacitor 36 respectively, and feed them to the amplifier represented by the twin triode 9'. The plate outputs of the amplifier 9' are respectively connected to two windings 23, 24 of the suspending electromagnet controlling the magnetic field in response to the distance between the rotor 2 and the coil 3.

In the last embodiment shown in FIG. 6 the value of the coefficient $a$ in the term $U_s - a.U_m$ is adjusted by supplying input voltage to the rectifier 22 through a voltage divider which consists of two coupled tuning condensers 18, 19 connected parallel to the capacitor 4 of the feeler, or replacing the capacitor 4. This circuit arrangement permits the factor $a$ to be adjusted without affecting the stability of the network, even if the rectifiers 12 and 22 are indirectly heated vacuum diodes. With such diodes a change of the coefficient $a$ in the circuits of FIGS. 4 and 5 would cause an undesirable change of the direct component which is proportional to the initial voltage of the diode 22.

The method and device of the invention may be used not only for holding rotors of ultra-centrifuges in position but wherever it is desired to control the position of ferromagnetic bodies magnetically suspended in evacuated spaces or in spaces which are inaccessible from the outside as is customary when working with radio-active materials.

What I claim is:
1. An apparatus for keeping a ferromagnetic body freely suspended comprising, in combination:
(a) electromagnetic means energizable for generating a magnetic field, and for thereby moving a ferromagnetic body toward and away from a normal position;
(b) sensing means responsive to the spacing of said body from said normal position thereof, said sensing means including
(1) a capacitor;
(2) an inductor in parallel LC circuit with said capacitor, said LC circuit having a predetermined resonant frequency, and
(3) pulse generator means connected to said LC circuit for feeding thereto repetitive electric pulses of predetermined amplitude at a frequency smaller than said resonant frequency, whereby a sequence of damped voltage oscillations is generated by each of said pulses in said LC circuit,
(4) said body being arranged within operative range of said inductor for varying the damping of said oscillations in said LC circuit when said body moves toward and away from said normal position thereof; and
(c) control means connected to said electromagnet means and to said sensing means for energizing the electromagnet means at a rate responsive to the difference of the maximum amplitude of each sequence of said oscillations and the rectified mean value of the amplitudes of said sequence of oscillations.

2. An apparatus as set forth in claim 1, wherein said inductor is spaced from the normal position of said ferromagnetic body in a direction away from said electromagnetic means.

3. An apparatus as set forth in claim 1, wherein said control means include means for generating respective output signals responsive to the maximum amplitude of each sequence of said oscillations and to the rectified mean value of the amplitudes of said sequence of oscillations, and comparing means for generating a control signal responsive to the difference of said output signal.

4. An apparatus as set forth in claim 3, wherein said means for generating an output signal responsive to the rectified mean value of said amplitudes include a rectifier means having a predetermined RC time constant smaller than the smallest time constant of said LC circuit during said movement of said ferromagnetic body.

5. An apparatus as set forth in claim 3, wherein said means for generating an output signal responsive to the maximum amplitude of each of said sequences of oscillations include rectifier means having a predetermined RC time constant greater than the greatest time constant of said LC circuit during said movement of said ferromagnetic body.

6. An apparatus as set forth in claim 3, wherein said means for generating an output signal each include rectifier means, and said comparing means include a differential amplifier connected for input to each of said rectifier means.

7. An apparatus as set forth in claim 3, further comprising a capacitative voltage divider arranged in parallel circuit to said inductor, and the means for generating an output signal responsive to said maximum amplitude include rectifier means connected to said voltage divider.

8. An apparatus as set forth in claim 3, wherein said comparing means include a differential amplifier.

9. An apparatus as set forth in claim 2, further comprising diode means for stabilizing said maximum amplitude, said diode means being connected in parallel to said inductor and to said capacitor, and blocking means for blocking said diode means at a stable blocking voltage smaller than the maximum amplitude of the voltage oscillations in said LC circuit.

10. An apparatus as set forth in claim 2, wherein said control means include means for generating a first output signal responsive to the maximum amplitude of each sequence of said oscillations, and means for generating a second output signal responsive to the rectified mean value of the amplitude of said sequence of oscillations; and said electromagnet means include two windings arranged to produce opposed magnetic fields, said output signal generating means being respectively connected to said windings for energizing the same.

11. An apparatus including a freely suspended ferromagnetic body comprising, in combination:

(a) a ferromagnetic body;

(b) electromagnet means energizable for generating a magnetic field, said electromagnet means being normally arranged above said ferromagnetic body for urging said body to move upward into a predetermined position against the force of gravity;

(c) sensing means responsive to movement of said body toward and away from said predetermined position, said sensing means including (1) a capacitor;

(2) an inductor in parallel LC circuit with said capacitor, said LC circuit having a predetermined resonant frequency, and (3) pulse generator means connected to said LC circuit for feeding thereto repetitive pulses of predetermined amplitude at a frequency smaller than said resonant frequency, whereby a sequence of damped oscillations is generated by each of said pulses in said LC circuit, (4) said body being arranged within operative range of said inductor for varying the damping of said oscillations in said LC circuit when said body moves toward and away from said normal position thereof;

(d) a power supply for energizing said electromagnet means; and (e) control means connected to said power supply and to said sensing means for controlling the energizing of said electromagnet means responsive to the difference between the maximum amplitude of each sequence of said oscillations and the rectified mean value of the amplitude of said sequence of oscillations.

References Cited by the Examiner
UNITED STATES PATENTS

| | | | |
|---|---|---|---|
| 2,256,937 | 9/41 | Beams et al. | 308—10 |
| 2,591,921 | 4/52 | Cosgriff et al. | 308—10 |
| 2,868,458 | 1/59 | Moore | 331—174 |
| 3,066,849 | 12/62 | Beams | 308—10 |

SAMUEL BERNSTEIN, *Primary Examiner.*